Figure 1:
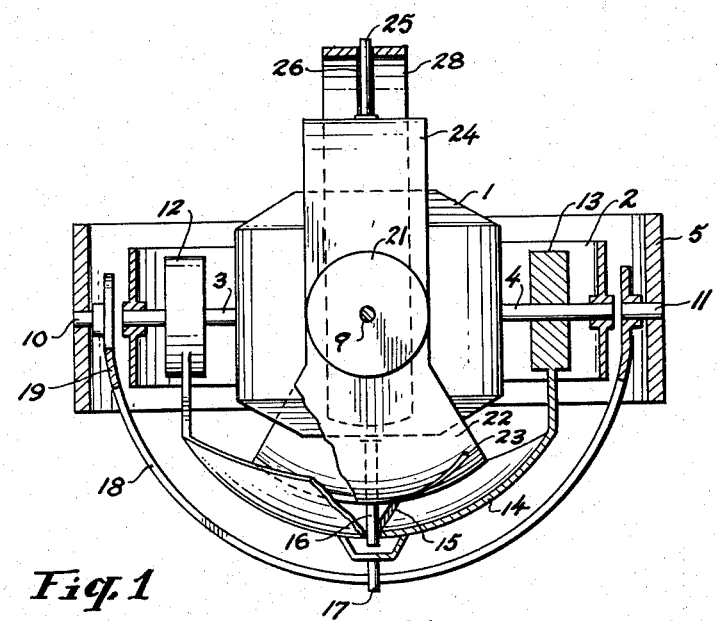

May 19, 1959  V. PLŠEK  2,886,972

SYSTEM FOR ADJUSTING THE ORIENTATION OF A GYROSCOPE

Filed Nov. 14, 1957 2 Sheets-Sheet 1

INVENTOR
Vladimír Plšek
BY Richard Chow
AGENT

INVENTOR
Vladimír Plšek
BY Richard ...
AGENT

2,886,972

SYSTEM FOR ADJUSTING THE ORIENTATION OF A GYROSCOPE

Vladimír Plšek, Prague, Czechoslovakia, assignor to Výzkumný a zkušební letecký ústav, Letňany, near Prague, Czechoslovakia Application November 14, 1957, Serial No. 696,464

4 Claims. (Cl. 74—5.44)

The present invention relates to a system for adjusting the orientation of a gyroscope mounted in a Cardan suspension, and particularly gyroscopes with a vertical rotational axis.

Gyroscopes in Cardan suspensions with a vertical axis, sometimes referred to as vertical gyroscopes are used for example, for the establishment of so-called artificial horizons and are usually provided with resetting systems for maintenance of the rotational axis of the flywheel in the vertical position. The gyroscope, having a high rotational speed and correspondingly large directive power, maintains the vertical position of its axis of rotation. The frictional torque in the bearings of the Cardan suspension and the accelerating forces react upon the gyroscope, which cannot be absolutely balanced during flight, and give rise to precessional movements, which cause deviations from the required vertical position of the rotational axis of the gyroscope. Some device for adjusting the orientation is therefore required, which, following a deviation of the rotational axis from its vertical position, produces rectifying torques which give rise to precessional movements for restoring the axis to its original vertical position.

Most of the presently used resetting systems of this kind use gravity as the actuating agent. Pneumatically driven gyroscopes or flywheels are frequently provided with 4 bores having outlets in a horizontal plane in the lower part of the flywheel arranged in pairs which are coincident with axes parallel with the axes of suspension of the gyroscope, and with the outlets being normally partly closed by suspended flaps which, in case of a deviation of the axis of the gyroscope from the required vertical position, remain in their vertical position and open to a certain degree the respective outlets of the deviated flywheel so that the reactions to the escaping air produce suitable rectifying torques, which cause the precessional movement for return of the flywheel to the original position.

In electrically driven gyroscopes, the resetting system frequently comprises a disc of electrically conductive material, for example, of copper, connected with and driven by the flywheel, and a permanent magnet pivoted like a pendulum below the disc and cooperating with the latter. In case of a deviation of the gyroscope axis from the required vertical position, the disc connected with the gyroscope deviates with respect to the permanent magnet, so that induced asymmetric eddy currents are produced in the disc for causing a precessional movement that returns the gyroscope to the original position with its axis in the vertical direction.

Other flywheels or gyroscopes with a vertical axis have resetting systems comprising an electrolytical or mercury level which, in case of deviations of the axis of the flywheel from its desired vertical position, causes suitably arranged contacts to supply current to motors producing torques around the respective axes of the flywheel or shifting masses along the respective axes of the flywheel suspension to change of the position of the center of gravity. This change originates suitable rectifying torques, which produce a precessional movement for returning the flywheel into its original vertical axial position.

These presently used systems for adjusting the orientation of gyroscopes either require a supply of compressed air, fed directly to the flywheel, or they are comparatively complicated and expensive, comprising functional elements, which from the point of view of safety and reliability of operation, cannot prevent possible failures. In many cases the known resetting systems considerably increase the weight of the whole arrangement and require a considerable space, what is rather inconvenient for aircraft instruments of small aircraft.

It is an object of the present invention to provide a mechanical resetting system for adjusting the orientation of gyroscopes having a vertical rotational axis which is independent from any supply of compressed air or electric current, simple in construction and operation, requires only a limited space and is of reasonable weight and safe or reliable in operation.

Figure 3:
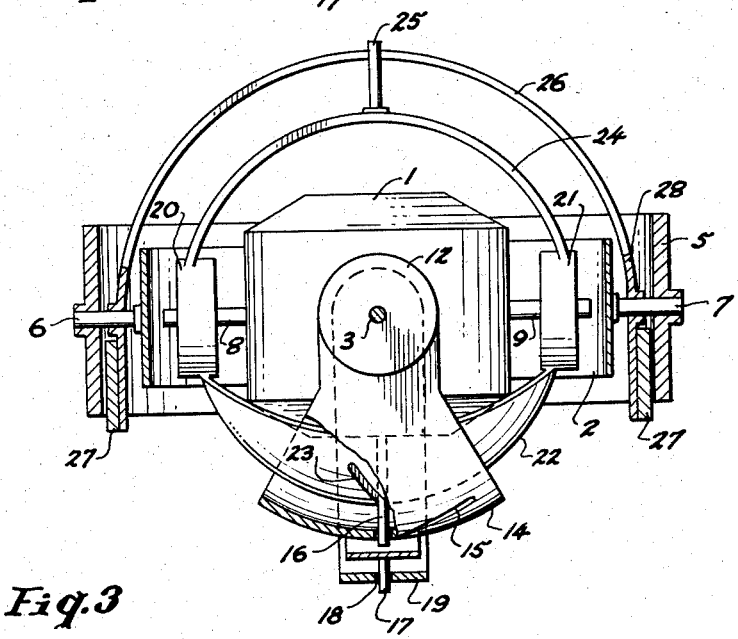
Figure 2:
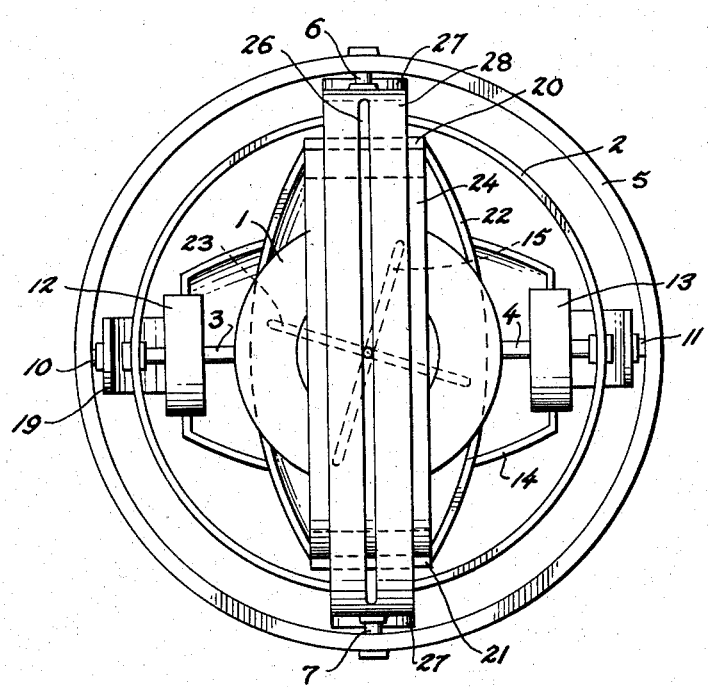

An embodiment of invention is shown schematically by way of example in the accompanying drawings, where Fig. 1 is an elevation view, partly in section, of a gyroscope with a resetting system, Fig. 2 is a top plan view of the gyroscope of Fig. 1, and Fig. 3 is an elevation view taken at right angles to the view of Fig. 1.

The gyroscope with a vertical axis is located in a case 1 which is suspended by means of pins 3 and 4, in a frame 2, so that the case 1 may freely pivot around the axis $x$.

The frame 2 is pivotally suspended in the frame 5 by means of pins 6 and 7 with their axis coincident with the axis $y$ perpendicular to axis $x$.

The gyroscope itself is provided besides with pins 3 and 4 in the axis $x$, by further pins 8 and 9 in the axis $y$. The frame 5 bears pins 10 and 11 in the axis $x$. The axis $x$ and $y$ are at a right angle and perpendicular to the axis $z$ and may be arranged in a single plane.

Two weights 12 and 13 are rotatably mounted on the pins 3 and 4, respectively, and are axially displaceable along the axis $x$, said weights being connected to each other by a spherical segment 14 having a slot 15 (Fig. 3) which is inclined with respect to the plane defined by the axis $x$ and the axis $z$, as shown in Fig. 2. A stud 16, which is connected with the lower part of the gyroscope case 1, engages in the slot 15. A further stud 17 is fixed to the lower part of the spherical segment 14, and engages in a slot 18 formed in a pendulum 19 suspended from the pins 10 and 11 carried by the frame 5 coaxially with the pins 3 and 4.

Weights 20 and 21 (Fig. 3) are rotatable and axially displaceable on pins 8 and 9 which are coincident with the axis $y$, and are connected to each other below the axis $y$ by a spherical segment 22 having a slot 23 which is inclined with respect to the plane defined by the axis $y$ and the axis $z$, as shown in Fig. 2. The stud 16 connected to the lower part of the gyroscope case also engages in the slot 23. The weights 20 and 21 are further connected to each other above the axis $y$ by a spherical segment 24 having a stud 25 firmly fixed thereto and engaging in a slot 26 which is formed in a segment 28 having pendulums 27 at its opposite ends pivoting around the axis $y$ on the pins 6 and 7 extending from frame 2.

The above described gyroscope having a vertical axis and Cardan suspension, and provided with a system for adjusting its orientation, is of the type having a limited angular displacement. This type has been chosen only for the sake of simplicity in demonstrating the system according to this invention for adjusting the orientation.

In order to return the gyroscope to its original vertical position after a deviation from the vertical position around the axis $x$, i.e. an angular movement of case 1 around the pins 3 and 4 with respect to frame, a precessional movement is effected by a torque, acting upon the gyroscope case 1 around the axis y, i.e. acting to turn the frame 2 around the pins 6 and 7 in the correct sense. The required torque for overcoming the deviation of the gyroscope around the axis x results from the movement of the stud 16 extending from the lower part of the gyroscope case 1 in the inclined slot 15 of the spherical segment 14, such movement causing a shifting of the weights 12 and 13 along the axis x in the correct sense and thus a disturbance of the equilibrium about the axis y which thereby produces a suitable torque, acting upon the gyroscope case 1 around the axis y without disturbing the equilibrium of the gyroscope case around the axis x. Such torque results in a precessional movement of the gyroscope around the axis y for returning it to the original vertical position.

It is apparent that the gyroscope with the weights 12 and 13 connected by the spherical segment 14 must be in equilibrium around the axes x and y, when the stud 16 is at the center of the slot 15 of the spherical segment 14, and thus corresponds to the normal position of the weights 12 and 13.

The spherical segment 14 with the weights 12 and 13 is maintained in its vertical position around the axis x only by the pendulum 19, the slot 18 of which is engaged by the stud 17 extending from the spherical segment 14. Free movement of the gyroscope case 1 around the axis y with respect to the pendulum 19 is allowed by reason of the fact that the stud 17 of the spherical segment 14 may freely move along the slot 18 in the pendulum.

In order to return the gyroscope 1 to its original vertical position after a deviation from the vertical position around the axis y, i.e. an angular movement of frame 2 around the pins 6 and 7 with respect to frame 5, a precessional movement is effected by a directing torque acting upon the gyroscope around the axis x, i.e. a torque acting to turn the case 1 around the pins 3 and 4 in the correct sense relative to the frame 2. This is achieved in response to deviation of the gyroscope 1 around the axis y by the movement of the stud 16 connected with the lower part of the gyroscope case in the inclined slot 23 provided in the spherical segment 22, whereby an axial shifting of the weights 20 and 21 is achieved in the correct direction so that the equilibrium is disturbed to create the correct torque acting upon the gyroscope 1 around the axis x without disturbing the equilibrium of the gyroscope around the axis y. This torque around the axis x causes a precessional movement of the gyroscope returning it to the original vertical position.

The gyroscope case 1 with the frame 2 and the weights 20 and 21 connected by the spherical segment 22 and the auxiliary spherical segment 24 must be in equilibrium around the axes x and y, when the stud 16 is at the center of the slot 23 of the spherical segment 22 and thus corresponds to the normal position of the weights 20 and 21.

The spherical segment 22 with the weights 20 and 21 is maintained in its vertical position with respect to the axis y by the pendulum 27 connected by the upper segment 28 which has the slot 26 slidably engaged by the stud 25 which extends from the auxiliary spherical segment 24 connected with the weights 20 and 21 and with the spherical segment 22.

The slidable engagement of stud 25 in slot 26 of the segment 28 connected with the pendulums 27 permits free movement of the gyroscope 1 around the axis x with respect to the pendulums 27.

In case of deviations of the gyroscope from the vertical position around both axes x and y, both of the above described rectifying torques act simultaneously, without causing any disturbing loss of equilibrium of the gyroscope in the Cardan suspension.

Possible disturbing frictional torques of the studs 16, 17 and 25 in the slots 15 and 23, 18, and 26, respectively, may be reduced to a minimum by adopting suitable existing structural arrangements for replacing the sliding friction by rolling friction, or by the employment of magnets or the like in place of the stud and slot connections of the illustrated embodiment.

It is a fundamental requirement, which is a feature of all astatically suspended flywheels in Cardan suspension, that the gyroscope system with the described weights and spherical segments associated therewith, is in equilibrium about the axes x and y even during deviation so long as the weights are in their normal position on the axes x and y.

As shown, the system for adjusting the orientation is purely mechanical with rotatable and slidable elements, which may for the most part, be produced by stamping, so that the manufacture of the device is very simple and therefore cheap.

The elements of described system are so arranged as to require only a limited space and permit the apparatus to be light and of small dimensions.

A major advantage of the device embodying the invention is the functional simplicity thereof which ensures perfect reliability and safety, what is of particular importance in aircraft. It is of course possible to arrange the masses of weights either above or below the plane of the axis of suspension of the gyroscope.

What I claim is:

1. In combination with a gyroscope rotating in a case mounted in a Cardan suspension including an inner frame having said gyroscope case suspended therein for pivoting around a first axis and an outer frame having said inner frame suspended therein for pivoting of the latter and said gyroscope case about a second axis perpendicular to said first axis; a system for adjusting the orientation of the rotational axis of said gyroscope comprising a first spherical segment suspended from said inner frame and free to pivot about said first axis and to be displaced along said first axis with respect to said gyroscope case and inner frame, a second spherical segment suspended from said gyroscope case and free to pivot about said second axis and to be displaced along the latter with respect to said gyroscope case and outer frame, said first segment having a slot therein lying in a plane which is inclined with respect to a plane passing through said first axis and said rotational axis of the gyroscope, said second segment having a slot therein lying in a plane which is inclined with respect to a plane passing through said second axis and said rotational axis of the gyroscope, a stud depending from said gyroscope case and engaging slidably in said slots of the first and second segments so that, when the rotational axis of said gyroscope is in an original predetermined position, said stud is centrally located with respect to said slots and said first and second segments are balanced about said second and first axes, respectively, and gravitationally actuated means tending to hold said first and second segments against pivoting about said first and second axes so that, upon deviation of said rotational axis of the gyroscope from said original position, said stud moves along said slots to correspondingly displace the segments in the direction of the pivoting axes thereof for creating unbalance forces which give rise to precessing movements restoring said rotational axis of the gyroscope to said original position.

2. In combination with a gyroscope rotating in a case mounted in a Cardan suspension including an inner frame having said gyroscope case suspended therein for pivoting around a first axis and an outer frame having said inner frame suspended therein for pivoting of the latter and said gyroscope case about a second axis perpendicular to said first axis; a system for adjusting the orientation of the rotational axis of said gyroscope comprising a first spherical segment suspended from said inner frame and free to pivot about said first axis and to be displaced along said first axis with respect to said gyroscope case and inner frame, a second spherical segment suspended from said gyroscope case and free to pivot about said second axis and to be displaced along the latter with respect to said gyroscope case and outer frame, said first segment having a slot therein lying in a plane which is inclined with respect to a plane passing through said first axis and said rotational axis of the gyroscope, said second segment having a slot therein lying in a plane which is inclined with respect to a plane passing through said second axis and said rotational axis of the gyroscope, a stud depending from said gyroscope case and engaging slidably in said slots of the first and second segments so that, when the rotational axis of said gyroscope is in an original predetermined position, said stud is centrally located with respect to said slots and said first and second segments are balanced about said second and first axes, respectively, first and second pendulum means which are mounted for pivotal movement about right angularly related axes so as to be gravitationally maintained in predetermined positions about the latter and which have arcuate slots lying in vertical planes passing through said first and second axes, respectively, from which said first and second segments are pivotally suspended, and pins extending from said first and second segments and slidably engaging in said slots of said first and second pendulum means, respectively, thereby to hold said first and second segments in predetermined positions with respect to turning about said first and second axes so that, upon deviation of said rotational axis of the gyroscope from said original position thereof, said stud moves along said slots of the segments to correspondingly displace the latter in the directions of the pivoting axes thereof for creating unbalance forces which give rise to precessing movements restoring said rotational axis of the gyroscope to said original position.

3. In combination with a gyroscope rotating in a case mounted in a Cardan suspension including an inner frame having said gyroscope case suspended therein for pivoting around a first axis and an outer frame having said inner frame suspended therein for pivoting of the latter and said gyroscope case about a second axis perpendicular to said first axis; a system for adjusting the orientation of the rotational axis of said gyroscope comprising a first spherical segment suspended from said inner frame and free to pivot about said first axis and to be displaced along said first axis with respect to said gyroscope case and inner frame, a second spherical segment suspended from said gyroscope case and free to pivot about said second axis and to be displaced along the latter with respect to said gyroscope case and outer frame, said first segment having a slot therein lying in a plane which is inclined with respect to a plane passing through said first axis and said rotational axis of the gyroscope, said second segment having a slot therein lying in a plane which is inclined with respect to a plane passing through said second axis and said rotational axis of the gyroscope, a stud depending from said gyroscope case and engaging slidably in said slots of the first and second segments so that, when the rotational axis of said gyroscope is in an original predetermined position, said stud is centrally located with respect to said slots and said first and second segments are symmetrically located with respect to said second and first axes, respectively each of said first and second segments having a pair of weights located on the pivoting axis of the related segment and spaced equally from the pivoting axis of the other segment when said related segment is symmetrically located relative to said pivoting axis of the other segment so that there is a balance of forces about said pivoting axis of each segment when said stud is centrally located in said slot, and gravitationally actuated means tending to hold said first and second segments against pivoting about said first and second axes so that, upon deviation of said rotational axis of the gyroscope from said original position, said stud moves along said slots to correspondingly displace said segments along the pivoting axes thereof, whereby the symmetry of each segment with respect to the pivoting axis of the other segment is disturbed and the related pairs of weights create unbalance forces which give rise to precessing movements for restoring said rotational axis of the gyroscope to said original position.

4. In combination with a gyroscope normally rotating about a vertical axis within a case mounted in a Cardan suspension including an inner frame having said case suspended therein for relative pivoting about a first axis perpendicular to the axis of rotation of said gyroscope and an outer frame having said inner frame suspended therein for relative pivoting about a second axis perpendicular to said first axis; a system for maintaining the vertical orientation of said axis of rotation of the gyroscope comprising first and second spherical segments pivotable about, and movable along said first and second axes, said first and second segments having first and second slots therein lying in planes which are inclined with respect to planes passing through said first axis and said axis of rotation and passing through said second axis and said axis of rotation, respectively, gravitationally actuated means retaining said first and second segments in predetermined positions in space with respect to pivoting about said first and second axes, and means projecting from said case of the gyroscope and movable along said first and second slots, said projecting means being centrally located in said slots when said axis of rotation of the gyroscope extends vertically and said first and second segments being then balanced about said second and first axes, respectively, so that, upon a deviation of said axis of rotation from its normal vertical orientation, said projecting means moves along said slot to cause corresponding displacement of said first and second segments along said first and second axes, respectively, whereby the balance of said first and second segments about said second and first axes, respectively, is disturbed to create torques giving rise to precessional movements restoring said axis of rotation of the gyroscope to its normal vertical orientation.

References Cited in the file of this patent

UNITED STATES PATENTS

| | | |
|---|---|---|
| 1,308,692 | Beattie | July 1, 1919 |
| 1,309,637 | Klahn | July 15, 1919 |
| 2,501,885 | Barnes | Mar. 28, 1950 |